US012553940B2

(12) United States Patent
Petenyi et al.

(10) Patent No.: US 12,553,940 B2
(45) Date of Patent: Feb. 17, 2026

(54) METHOD AND APPARATUS FOR DETECTING POWER-ON RESET THRESHOLD

(71) Applicant: STMicroelectronics International N.V., Geneva (CH)

(72) Inventors: Sandor Petenyi, Lysa nad Labem (CZ); Lukas Burian, Hudlice (CZ)

(73) Assignee: STMicroelectronics International N.V., Geneva (CH)

( * ) Notice: Subject to any disclaimer, the term of this patent is extended or adjusted under 35 U.S.C. 154(b) by 278 days.

(21) Appl. No.: 18/203,737

(22) Filed: May 31, 2023

(65) Prior Publication Data

US 2024/0402241 A1  Dec. 5, 2024

(51) Int. Cl.
*G01R 31/28* (2006.01)
*G01R 27/08* (2006.01)
*G01R 31/52* (2020.01)

(52) U.S. Cl.
CPC ......... *G01R 31/2884* (2013.01); *G01R 27/08* (2013.01)

(58) Field of Classification Search
CPC ......... G01R 31/52; G01R 31/00; G01R 27/02
See application file for complete search history.

(56) References Cited

U.S. PATENT DOCUMENTS

| | | | | |
|---|---|---|---|---|
| 6,378,091 B1* | 4/2002 | Hashimoto | ............ | G11C 29/46 714/724 |
| 6,587,978 B1* | 7/2003 | Merritt | ................... | G11C 29/14 365/201 |
| 7,420,791 B1* | 9/2008 | Dong | ............... | G01R 31/31721 361/90 |
| 8,102,168 B1 | 1/2012 | Wong | | |
| 2004/0008024 A1* | 1/2004 | Miller | ............... | G01R 31/31723 324/762.03 |
| 2007/0216397 A1 | 9/2007 | Chan et al. | | |
| 2011/0121870 A1* | 5/2011 | Morino | ................... | H03K 17/22 327/143 |
| 2015/0378385 A1* | 12/2015 | Rana | ..................... | H03K 3/3562 327/143 |
| 2016/0056811 A1 | 2/2016 | Wadhwa et al. | | |
| 2020/0058364 A1 | 2/2020 | Troy | | |
| 2021/0111716 A1 | 4/2021 | Balasubramaniam | | |
| 2023/0115936 A1 | 4/2023 | Polisi et al. | | |

OTHER PUBLICATIONS

Amir, M., et al.: "Design and Test On-Chip Power-on-Reset (POR) Function in Battery Switchover IC," AIP Conference Proceedings 2291, 020011 (2020), 11 pgs.

* cited by examiner

*Primary Examiner* — Huy Q Phan
*Assistant Examiner* — Temilade S Rhodes-Vivour
(74) *Attorney, Agent, or Firm* — Crowe & Dunlevy LLC

(57) ABSTRACT

Disclosed herein is a testing circuit for indirectly testing generation of a power-on-reset signal within an integrated circuit (IC). The testing circuit includes a switch configured to selectively disconnect an internal circuit from a test pin of the IC in response to start-up of the IC, a plurality of resistors connected between the test pin and a respective plurality of switches that are configured to selectively connect ones of the plurality of resistors to ground in response to corresponding control signals, and a control circuit configured to produce, at the test pin, a resistance indicative of status of generation of the POR signal by selectively operating the plurality of switches based upon statuses of a plurality of signals from which the POR signal is generated.

20 Claims, 5 Drawing Sheets

METHOD AND APPARATUS FOR DETECTING POWER-ON RESET THRESHOLD

TECHNICAL FIELD

This disclosure relates to the field of power-on reset (POR) circuits and, in particular, to test circuitry enabling the indirect testing of a POR circuit.

BACKGROUND

A power-on reset (POR) signal is employed in integrated circuits and systems for initialization upon power-up. The POR signal resets various logic components within the integrated circuit or system to a known state, providing for predictable and expected operation thereafter.

A known power-on reset (POR) circuit 10 is illustrated in FIG. 1. The POR circuit comprises a first voltage regulator 11 that generates a ~5V regulated voltage VRREF1 at node N1 from an input voltage VINF, and a second voltage regulator 12 that generates a ~1.8V regulated voltage VRREF2 at node N2 based on a bandgap voltage VBG produced by a bandgap generator 16. A first voltage divider, formed by series-connected resistors R1 and R2, is connected between node N1 and ground, with node N3 being a tap between resistors R1 and R2. Similarly, a second voltage divider, formed by series-connected resistors R3 and R4, is connected between node N2 and ground, with node N4 being a tap between resistors R3 and R4.

A first hysteretic comparator 13 compares the voltage at node N3 to the bandgap voltage VBG and asserts its output when the voltage at node N3 is at least equal to the bandgap voltage VBG. In this case, the values of resistors R1 and R2 are set so that when the voltage at node N3 is at least equal to the bandgap voltage VBG, it can be inferred that the first voltage regulator 11 is functioning properly. A second hysteretic comparator 14 compares the voltage at node N4 to the bandgap voltage VBG and asserts its output when the voltage at node N4 is at least equal to the bandgap voltage VBG. Here, the values of resistors R3 and R4 are set so that when the voltage at node N4 is at least equal to the bandgap voltage VBG, it can be inferred that the second voltage regulator 12 is functioning properly.

A logic gate 15 performs a logical AND operation on the outputs of hysteretic comparators 13 and 14, a signal BG_OK indicative of the bandgap voltage VBG being stabilized, and a signal OSC_OK (received from an oscillator 19) indicative of whether the clock frequency has stabilized. The output of the AND gate 15 is inverted by the inverter 17 to produce a POR signal. As will be understood by those of skill in the art, when the POR signal is asserted, that indicates that the system is in a reset state, and when the POR signal is disserted, the system is in an operational state.

Through this functionality therefore, the POR signal is deasserted when the proper functioning of voltage regulators 11 and 12 has been verified, the bandgap voltage VBG has stabilized, and the clock frequency has stabilized. Consequently, it is safe to use the POR signal to reset logic circuits within a logic core 18 of the integrated circuit (IC) incorporating the POR circuit 10.

The ability to verify the proper generation of the POR signal is of particular interest in integrated circuit (IC) design. However, testing the POR signal is challenging due to the potential issues that may arise from modifying or manipulating the POR signal. Such issues may include, for instance, creating a loop that prevents the valid reset of the logic core 18, which could compromise the functionality of the IC. As the logic core 18 is responsible for processing instructions and data, providing for its proper reset is to be performed. Therefore, it is desired to allow the POR signal to operate as designed without interference.

Although ICs often have test modes that enable the testing of their internal functions, testing the POR signal using such test modes is not feasible. This is because the POR signal resets the logic core 18, which is responsible for executing the test mode itself. Since the POR signal would affect the very component that would be testing it, using a test mode to evaluate the POR signal is not possible.

Given these challenges, alternative solutions for testing for the proper generation of the POR signal have been developed. One such solution involves testing current consumption, while another involves indirect measurement of the POR signal. A third approach proposes modifying the IC to add an extra pin.

The POR signal causes a near-simultaneous reset of the components within the logic core 18, leading to an increase in current consumption. By monitoring the actual current consumed by the core 18 after initiating a power-on reset, it can be assumed based upon an expected power draw that the POR circuit 10 is functioning properly, and therefore the successful generation of the POR signal can be inferred. Indirect measurement involves observing a signal related to the POR signal's generation but not the POR signal itself. If this signal behaves as expected, it can be inferred that the POR signal has been successfully generated. However, both current consumption testing and indirect measurement can be time-consuming and may not be practical or efficient for certain applications.

As mentioned, an extra pin may be added to the IC for POR signal testing purposes. However, the IC may not have sufficient space for an extra pin, or if there were space, it would likely be preferred to allocate the extra pin for purposes other than POR signal testing.

Considering these limitations, further development is needed to devise efficient and practical methods for testing the POR signal in integrated circuits.

SUMMARY

Disclosed herein is a testing circuit for indirectly testing generation of a power-on-reset (POR) signal within an integrated circuit (IC). The testing circuit includes a switch configured to selectively disconnect an internal circuit from a test pin of the IC in response to start-up of the IC, a plurality of resistors connected between the test pin and a respective plurality of switches that are configured to selectively connect ones of the plurality of resistors to ground in response to corresponding control signals, and a control circuit configured to produce, at the test pin, a resistance indicative of status of generation of the POR signal by selectively operating the plurality of switches based upon statuses of a plurality of signals from which the POR signal is generated.

The control circuit may include one or more decoders.

The statuses of the plurality of signals based upon which the POR signal is generated may be determined based upon signals indicative of those statuses.

The signals indicative of the statuses of the plurality of signals may include at least one regulator status signal, at least one reference voltage generator status signal, and at least one clock status signal.

The at least one regulator status signal may be indicative of a regulated voltage generated by an associated voltage regulator being within desired thresholds, with the at least one reference voltage generator status signal being indicative of stabilization of a reference voltage generated by an associated reference voltage generator, and the at least one clock status signal being indicative of stabilization of an associated clock signal.

The test pin may be an Under-Voltage Lock-Out pin, and the internal circuit may be Under-Voltage Lock-Out circuitry configured to determine whether a supply voltage for the IC has fallen below a lower threshold.

The test pin may be an Over-Voltage Lock-Out pin, and the internal circuit may be Over-Voltage Lock-Out circuitry configured to determine whether a supply voltage for the IC has risen above an upper threshold.

An additional switch may be configured to selectively disconnect an additional internal circuit from an additional test pin of the IC in response to start-up of the IC. An additional plurality of resistors may be connected between the additional test pin and a respective additional plurality of switches that are configured to selectively connect ones of the additional plurality of resistors to ground in response to corresponding additional control signals. An additional control circuit may be configured to produce, at the additional test pin, a resistance indicative of status of generation of the POR signal by selectively operating the additional plurality of switches using the additional control signals based upon statuses of an additional plurality of signals based upon which the POR signal is generated.

The statuses of the additional plurality of signals based upon which the POR signal is generated may be determined based upon signals indicative of those statuses.

The signals indicative of the statuses of the plurality of signals may include at least one regulator status signal.

The at least one regulator status signal may be indicative of a regulated voltage generated by an associated voltage regulator being within desired thresholds.

The signals indicative of the statuses of the plurality of signals may include at least one reference voltage generator status signal and at least one clock status signal. The at least one reference voltage generator status signal may be indicative of stabilization of a reference voltage generated by an associated reference voltage generator, and the at least one clock status signal may be indicative of stabilization of an associated clock signal.

The additional test pin may be an Under-Voltage Lock-Out pin, and the additional internal circuit may be Under-Voltage Lock-Out circuitry configured to determine whether a supply voltage for the IC has fallen below a lower threshold. The additional test pin may be an Over-Voltage Lock-Out pin, and the additional internal circuit may be Over-Voltage Lock-Out circuitry configured to determine whether a supply voltage for the IC has risen above an upper threshold.

Also disclosed herein is a method aspect. In particular, disclosed herein is a method for indirectly testing generation of a power-on-reset (POR) signal within an integrated circuit (IC). This method includes disconnecting one or more test pins from corresponding internal circuit(s), determining a status of a plurality of signals based upon which the POR signal is generated, changing a resistance at the one or more test pins based upon the determined statuses of the plurality of signals, measuring the resistance at the one or more test pins, and determining a status of generation of the POR signal based upon the measured resistance(s).

Measuring the resistance at the one or more test pins may include applying a constant current to the one or more test pins and measuring resulting voltages at those one or more test pins. Determining the status of generation of the POR signal may be performed based upon the resulting voltage (s).

The status of the plurality of signals based upon which the POR signal is generated may be determined by monitoring a plurality of status signals indicative of the status of the plurality of signals based upon which the POR signal is generated. The resistance at the one or more test pins may be changed based upon the determined statuses of the plurality of signals by operating a series of switches to selectively connect one or more resistors between the one or more test pins and ground based upon the plurality of status signals.

The plurality of status signals may include one or more of at least one reference voltage generator status signal indicative of stabilization of a reference voltage generated by an associated reference voltage generator, at least one clock status signal indicative of stabilization of an associated clock signal, and at least one regulator status signal indicative of a regulated voltage generated by an associated voltage regulator being within desired thresholds.

The one or more test pins may include an Under-Voltage Lock-Out pin while the internal circuit is Under-Voltage Lock-Out circuitry configured to determine whether a supply voltage for the IC has fallen below a lower threshold.

The one or more test pins may include an Over-Voltage Lock-Out pin while the internal circuit is Over-Voltage Lock-Out circuitry configured to determine whether a supply voltage for the IC has risen above an upper threshold.

The status of the plurality of signals based upon which the POR signal is generated may be determined by monitoring a plurality of status signals indicative of the status of the plurality of signals based upon which the POR signal is generated. The resistance at the one or more test pins may be changed based upon the determined statuses of the plurality of signals by operating a series of switches to selectively connect one or more resistors in series between the one or more test pins and ground based upon the plurality of status signals.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

Disclosed herein is a power-on-reset (POR) signal testing circuit 50 that enables the indirect testing of the POR signal by evaluating POR-related signals, which allows for the determination of the proper generation of the POR signal and provides for easy external reading of the status of the POR signal.

Figure 1:
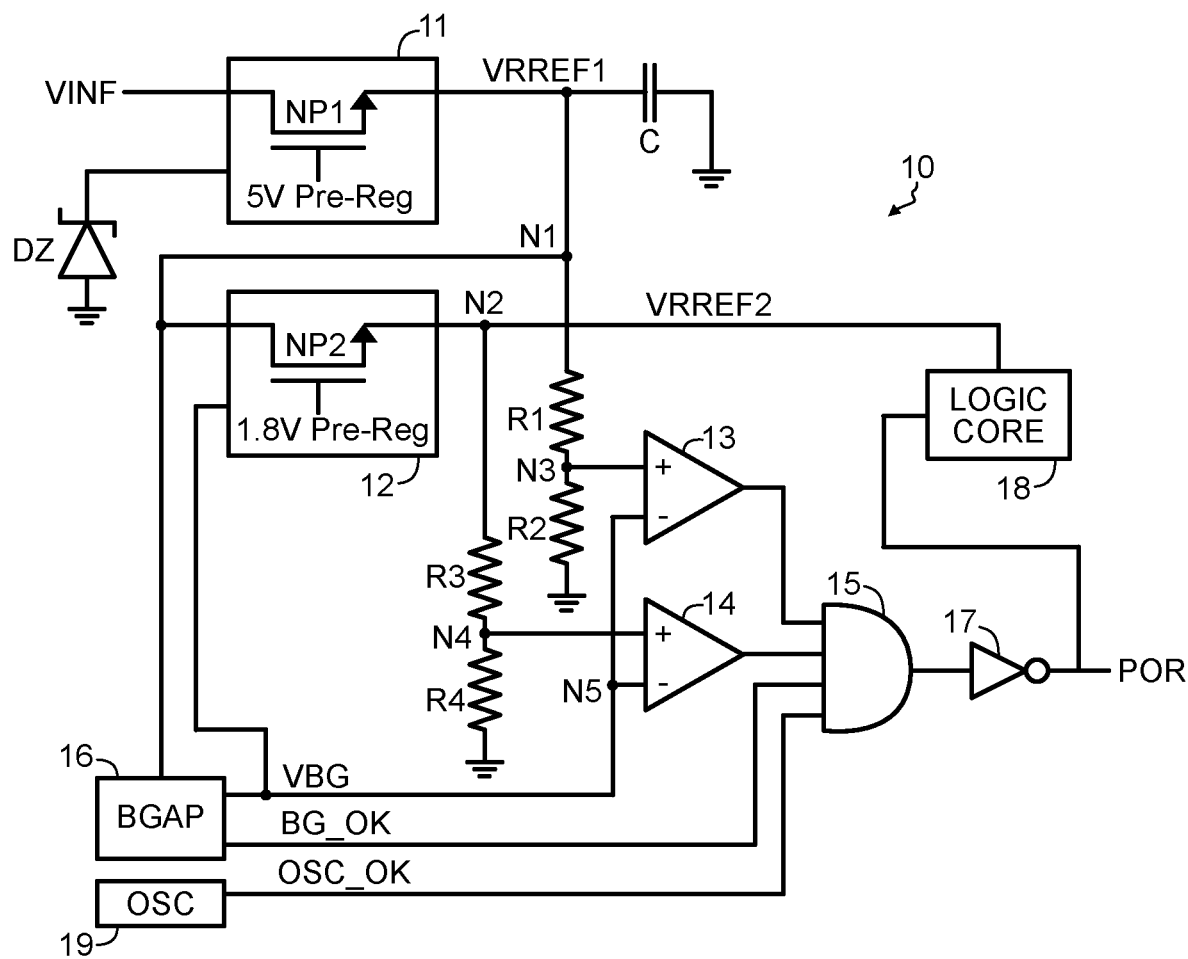
FIG. 1 is a block diagram of a known power-on reset (POR) signal generation circuit.
Figure 2:
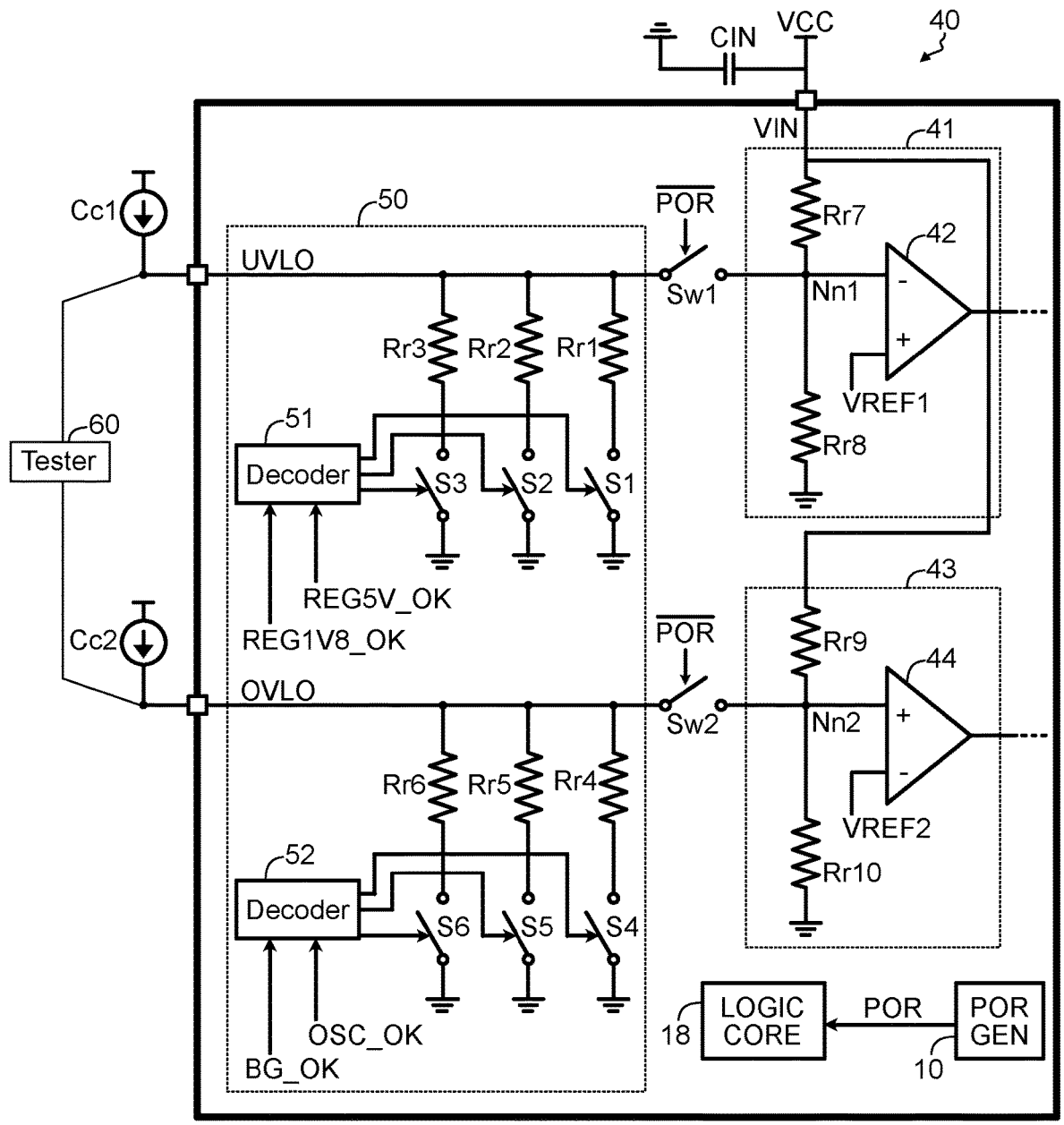
FIG. 2 is a block diagram of an integrated circuit disclosed herein which includes power-on reset (POR) signal testing circuitry.

Shown in FIG. 2 is an integrated circuit (IC) 40 into which the POR signal testing circuit 50 is incorporated. The IC 40 includes Under-Voltage Lock-Out (UVLO) circuitry 41, Over-Voltage Lock-Out (OVLO) circuitry 43, and the POR signal testing circuit 50. The IC also includes a POR reset signal generator 10 and a logic core 18, described in FIG. 1.

The IC 40 includes an input voltage VIN pin, a UVLO pin, and an OVLO pin. A supply voltage VCC is connected to the input voltage VIN pin, and a decoupling capacitor CIN is connected between the input voltage VIN pin and ground. As will be explained, during power-on, the POR signal testing circuitry 50 is connected to the UVLO pin while the UVLO circuitry 41 is disconnected from the UVLO pin via the default opening of switch Sw1 at startup, and the POR signal testing circuitry 50 is likewise connected to the OVLO pin while the OVLO circuitry 43 is disconnected from the OVLO pin via the default opening of switch Sw2 at startup.

The UVLO circuitry 41 includes a resistor Rr7 connected between the input voltage VIN pin and node Nn1 and a resistor Rr8 connected between node Nn1 and ground, with a comparator 42 having its inverting input terminal connected to node Nn1 and having its non-inverting input terminal connected to a first reference voltage VREF1. When activated via the closing of switch Sw1 by the logic core 18, the UVLO circuitry 41 determines whether the voltage at node Nn1 (generated from the input voltage VIN) has fallen below the first reference voltage VREF1, which represents the undervoltage lock-out level.

The OVLO circuitry 43 includes a resistor Rr9 connected between the input voltage VIN pin and node Nn2 and a resistor Rr10 connected between node Nn2 and ground, with a comparator 44 having its inverting input terminal connected to node Nn2 and having its non-inverting input terminal connected to a second reference voltage VREF2. When activated via the closing of switch Sw2 by the logic core 18, the OVLO circuitry 43 determines whether the voltage at node Nn2 (generated from the input voltage VIN) has risen above the second reference voltage VREF2, with represents the overvoltage lock-out level.

Note that when the switches Sw1 and Sw2 are open, the UVLO circuitry 41 and OVLO circuitry 43 functions properly based upon the voltage at nodes Nn1 and Nn2.

The POR signal testing circuit 50 includes a first resistor Rr1 selectively connected between the UVLO pin and ground by a switch S1, a second resistor Rr2 selectively connected between the UVLO pin and ground by a switch S2, and a third resistor Rr3 selectively connected between the UVLO pin and ground by a switch S3, with a decoder 51 controlling the operation of switches S1, S2, and S3. The decoder 51 operates to decode a multi-bit binary input into 1 of N outputs, meaning that the decoder 51 asserts one of its N outputs in response to the multi-bit binary input, and does not assert multiple inputs simultaneously.

The POR signal testing circuit 50 further includes a fourth resistor Rr4 selectively connected between the OVLO pin and ground by a switch S4, a fifth resistor Rr5 selectively connected between the OVLO pin and ground by a switch S5, and a sixth resistor Rr6 selectively connected between the OVLO pin and ground by a switch S6, with a decoder 52 controlling the operation of switches S4, S5, and S6. The decoder 52 operates to decode a multi-bit binary input into 1 of N outputs, meaning that the decoder 52 asserts one of its N outputs in response to the multi-bit binary input, and does not assert multiple inputs simultaneously.

The decoder 51 operates the switches S1, S2, and S3 based upon a first signal REG5V_OK indicative of proper operation of an internal 5V voltage regulator (e.g., indicative of whether the regulated 5V signal is within desired thresholds) and a second signal REG1V8_OK indicative of proper operation of an internal 1.8V voltage regulator (e.g., indicative of whether the regulated 1.8V signal is within desired thresholds). The decoder 52 operates the switches S4, S5, and S6 based upon a third signal BG_OK indicative of proper operation of a bandgap voltage regulator (e.g., indicative of whether the bandgap voltage has stabilized and is properly regulated) and a fourth signal OSC_OK indicative of whether the clock frequency has stabilized.

Recall that in the POR signal generator of FIG. 1, the POR signal is generated based upon the verification of the proper operation of the 5V regulator 11, 1.8V regulator 12, and assertions of the BG_OK and OSC_OK signals. Therefore, if proper operation of the 5V regulator and the 1.8V regulator is verified, and the BG_OK and OSC_OK signals are asserted to indicate that the bandgap voltage has stabilized and that the clock frequency has stabilized, it can be inferred that the POR signal is being generated properly, without directly acting upon or monitoring the POR signal itself.

To accomplish this, during startup, the switch Sw1 is opened and a first constant current Cc1 is provided to the UVLO pin and the decoder 51 operates the switches S1, S2, and S3 so as to indicate the status of the first signal REG5V_OK (and thus the status of the 5V voltage regulator) and the status of the second signal REG1V8_OK (and thus the status of the 1.8V voltage regulator). This is done through a change in the voltage at the UVLO pin which may be sensed by a tester 60 coupled to the UVLO pin, caused by a change in the resistance between the UVLO pin and ground resulting from the switching of the switches S1, S2, and S3 by the decoder 51. Similarly, during startup or in a test mode, the switch Sw2 is opened and a second constant current Cc2 is provided to the OVLO pin and the decoder 52 operates the switches S4, S5, and S6 so as to signalize the status of the BG_OK signal (and thus the status of the bandgap voltage regulator) and the status of the OSC_OK signal (and thus the status of the oscillator). This is done through a change in the voltage at the OVLO pin which may be sensed by a tester 60 coupled to the OVLO pin, caused by a change in the resistance between the OVLO pin and ground resulting from the switching of the switches S4, S5, and S6 by the decoder 52.

Observe that the decoders 51 and 52 lack an enable input, because when the REG1V8_OK and REG5V_OK signals and the BG_OK and OSC_OK signals are all asserted, the switches S1-S6 are opened. In an alternative embodiment, however, the decoders 51 and 52 may have enable inputs if desired.

A specific example will now be given. Assume that resistors Rr1 and Rr4 have a resistance of 40 kΩ, that resistors Rr2 and Rr5 have a resistance of 20 kΩ, and that resistors Rr3 and Rr6 have a resistance of 10 kΩ. Therefore, different resistances between the UVLO pin and ground may be set based upon which of switches S1, S2, and S3 are closed, and different resistances between the OVLO pin and ground may be set based upon which of switches S4, S5, and S6 are closed.

Assume that both constant currents Cc1 and Cc2 are 10 μA. Since the constant current Cc1 is applied at the UVLO pin, the voltage at the UVLO pin is therefore dependent upon the position of the switches S1, S2, and S3. Similarly, since the constant current Cc2 is applied at the OVLO pin, the voltage at the OVLO pin is therefore dependent upon the position of the switches S4, S5, and S6.

Therefore, if switch S1 is closed while switches S2 and S3 are open, a resistance of 40 kΩ is present between the UVLO pin and ground, and a voltage of 400 mV is therefore present at the UVLO pin. If switch S2 is closed while switches S1 and S3 are open, a resistance of 20 kΩ is present between the UVLO pin and ground, and a voltage of 200 mV therefore present at the UVLO pin. If switch S3 is closed while switches S1 and S2 are open, a resistance of 10 kΩ is present between the UVLO pin and ground, and a voltage of 100 mV is present at the UVLO pin.

If switches S1, S2, and S3 are open, the resistance present between the UVLO pin and ground is effectively infinite due to the open circuit being present. Therefore, in this example:
- the decoder 51 may close switch S3 while keeping switches S1 and S2 open to indicate that the first signal REG5V_OK is indicative of the 5V voltage regulator not functioning properly and the second signal REG1V8_OK is indicative of the 1.8V voltage not regulator functioning properly,
- the decoder 51 may close switch S2 while keeping switches S1 and S3 open to indicate that the first signal REG5V_OK is indicative of the 5V voltage regulator functioning properly but the second signal REG1V8_ok is indicative of the 1.8V voltage regulator not functioning properly,
- the decoder 51 may close switch S1 while keeping switches S2 and S3 closed to indicate that the second signal REG1V8_ok is indicative of the 1.8V voltage regulator functioning properly but the first signal REG5V_OK is indicative of the 5V voltage regulator not functioning properly, and
- the decoder 51 may open switches S1, S2, and S3 to indicate that the first signal REG5V_OK is indicative of the 5V voltage regulator functioning properly and that the second signal REG1V8_ok is indicative of the 1.8V voltage regulator functioning properly.

The following truth table summarizes the operation of switches S1, S2, and S3, and the resulting resistance seen at UVLO dependent upon the logic values of REG1V8_OK and REG5V_OK.

| REG1V8_OK | REG5V_OK | S1 | S2 | S3 | Resistance at UVLO |
|---|---|---|---|---|---|
| 0 | 0 | 0 | 0 | 1 | 10 kΩ |
| 0 | 1 | 0 | 1 | 0 | 20 kΩ |
| 1 | 0 | 1 | 0 | 0 | 40 kΩ |
| 1 | 1 | 0 | 0 | 0 | Infinite |

If switch S4 is closed while switches S5 and S6 are open, a resistance of 40 kΩ is present between the OVLO pin and ground, and a voltage of 400 mV is therefore present at the OVLO pin. If switch S5 is closed while switches S4 and S6 are open, a resistance of 20 kΩ is present between the OVLO pin and ground, and a voltage of 200 mV therefore present at the OVLO pin. If switch S6 is closed while switches S4 and S5 are open, a resistance of 10 kΩ is present between the OVLO pin and ground, with a voltage of 100 mV therefore present at the OVLO pin. If switches S4, S5, and S6 are open, an open circuit is present between the OVLO pin and ground. Therefore, in this example:
- the decoder 52 may close switch S6 while opening switches S4 and S5 to indicate that the signal OSC_OK is indicative of the clock frequency not having stabilized and that the signal BG_OK is indicative of the bandgap voltage regulator not functioning properly;
- the decoder 52 may close switch S5 while opening switches S1 and S6 to indicate that the signal OSC_OK is indicative of the clock frequency having stabilized and that the signal BG_OK is indicative of the bandgap voltage regulator not functioning properly;
- the decoder 52 may close switch S4 while opening switches S5 and S6 to indicate that the signal OSC_OK is indicative of the clock frequency not having stabilized but the signal BG_OK is indicative of the bandgap voltage regulator functioning properly, and
- the decoder 52 may open switches S4, S5, and S6 to indicate that the signal OSC_OK is indicative of the clock frequency having stabilized and the signal BG_OK is indicative of the bandgap voltage regulator functioning properly.

The following truth table summarizes the operation of switches S4, S5, and S6, and the resulting resistance seen at OVLO dependent upon the logic values of BG_OK and OSC_OK.

| OSC_OK | BG_OK | S4 | S5 | S6 | Resistance at OVLO |
|---|---|---|---|---|---|
| 0 | 0 | 0 | 0 | 1 | 10 kΩ |
| 0 | 1 | 0 | 1 | 0 | 20 kΩ |
| 1 | 0 | 1 | 0 | 0 | 40 kΩ |
| 1 | 1 | 0 | 0 | 0 | Infinite |

Figure 3A:
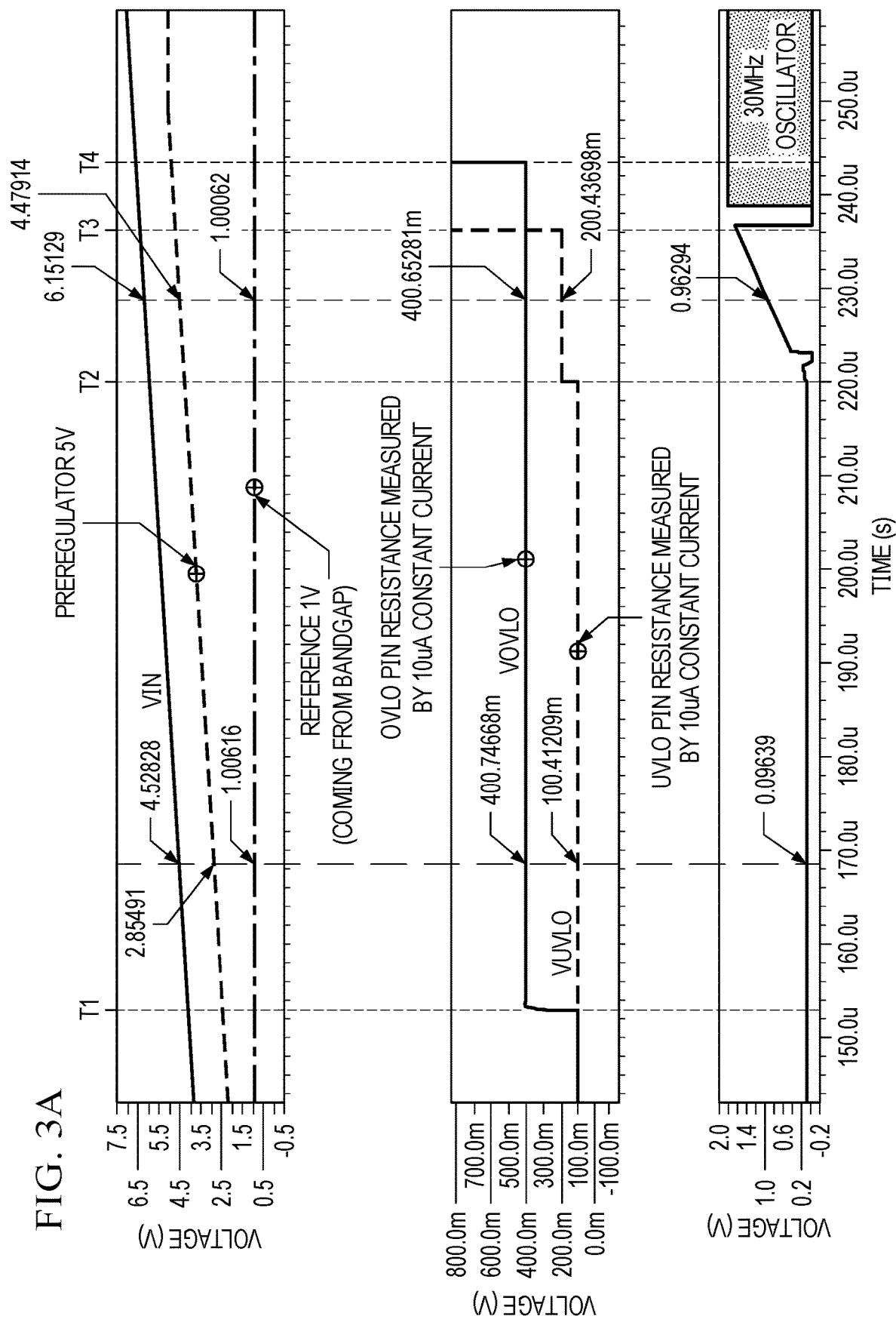
FIG. 3A and FIG. 3B are graphs of various signals of the integrated circuit of FIG. 2 during operation.
Figure 3B:
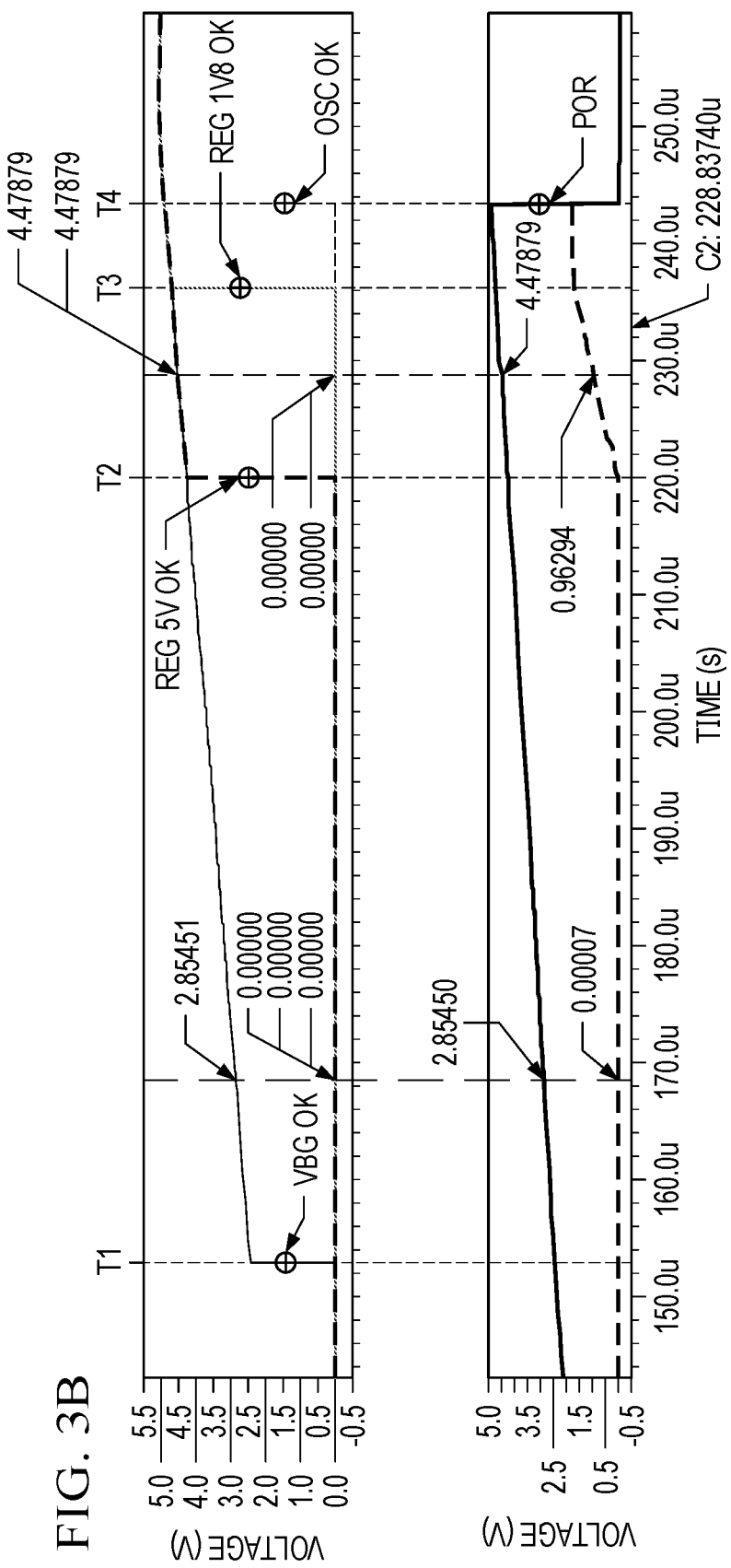

An example can be seen in the graphs of FIG. 3A and FIG. 3B. Prior to time T1, the REG5V_OK and REG1V8_OK signals are at a logic low (indicative of the 5V regulator and the 1.8V regulator not functioning properly), the BG_OK signal is at a logic low (indicative of the bandgap voltage regulator not functioning properly), and the OSC_OK signal is at a logic low (indicative of the clock frequency not having stabilized), and therefore the voltage VUVLO at the UVLO pin remains at 100 mv, as does the voltage VOVLO at the OVLO pin.

At time T1, the BG_OK signal now rises to a logic high (indicative of the bandgap voltage regulator functioning properly), and the voltage VOLVO accordingly rises to 400 mV. At time T2, the REG5V_OK signal now rises to a logic high (indicative of the 5V regulator now functioning properly) and the voltage VUVLO rises to 200 mV. At time T3, the REG1V8_OK signal now rises to a logic high (indicative of the 1.8V regulator now functioning properly) and the voltage VUVLO rises to 800 mV. Finally, at time T4, the OSC_OK signal now rises to a logic high (indicative of the clock frequency not having stabilized) and the voltage VOLVO rises to to a high level because the POR signal is deasserted and the OVLO pin is switched into normal function to be connected to the internal divider. Here, a current of 10 uA injected into the internal divider (having around 100 kΩ resistance) will create voltage drop of about 1V.

Note that at time T4, the POR signal rises to a logic high. Thus, at time T4, through the values of VUVLO and VOVLO, the status of the POR signal is known without acting upon or measuring the POR signal.

It should be understood that any signals utilized in the generation of the POR signal may be tested by the POR signal test circuitry 50 in order to determine the status of the POR signal, and that the specific signals discussed herein need not be used. It should also be understood that there may be any number of such signals, and that the number of switches S1-S6 and resistors R1-R6 may be adjusted accordingly so that the decoders 51 and 53 may generate a suitable number of control signals for said switches. For m signals, each decoder may control $2^m$ switches to make resistance selections, for example.

It should also be understood that instead of both the UVLO and OVLO pins being utilized, the POR signal test circuitry 50 may instead utilize one of the pins, with the switches S1-S6 selectively connecting the pin used to ground through the resistors R1-R6, with a single decoder operating switches S1-S6, and therefore with a single output at the pin indicating the status of the POR signal.

Figure 4:
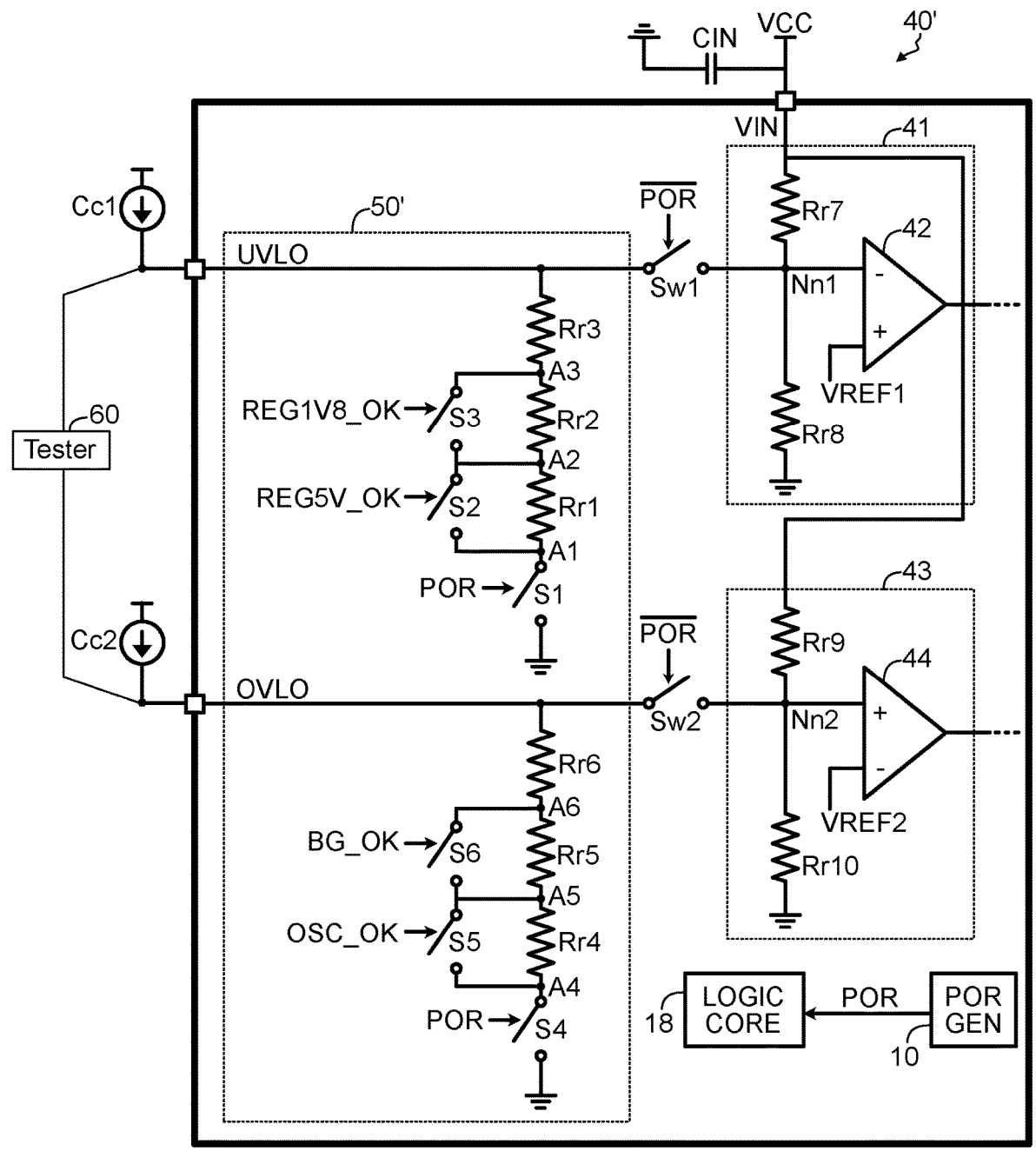
FIG. 4 is a block diagram of another integrated circuit disclosed herein which includes power-on reset (POR) signal testing circuitry.

As another variation, the decoders need not be present. See the IC 40' of FIG. 4, in which the POR signal test circuitry 50' lacks decoders and is arranged differently. Here, resistor Rr3 is connected between the UVLO pin and node A3, resistor Rr2 is connected between nodes A3 and A2, and resistor Rr1 is connected between nodes A2 and A1. A switch S3, controlled in response the REG1V8_OK signal, is connected between nodes A3 and A2, while a switch S2, controlled in response to the REG5V_OK signal, is connected between nodes A2 and A1. A switch S1, controlled by response to the POR signal, is likewise connected between node A1 and ground.

Similarly, resistor Rr6 is connected between the OVLO pin and node A6, resistor Rr5 is connected between nodes A6 and A5, and resistor Rr4 is connected between nodes A5 and A4. A switch S6, controlled in response the BG_OK signal, is connected between nodes A6 and A5, while a switch S5, controlled in response to the OSC_OK signal, is connected between nodes A5 and A4. A switch S4, controlled by response to the POR signal, is likewise connected between node A4 and ground.

Operation is now described. The switches S1-S3 are operated to set the resistance seen at the UVLO pin in response to the REG1V8_OK and REG5V_OK signals, while the switches S4-S6 are operated to set the resistance seen at the OVLO pin in response to the BG_OK and OSC_OK signals.

Assume that resistors Rr1 and Rr4 have a resistance of 40 kΩ, that resistors Rr2 and Rr5 have a resistance of 20 kΩ, and that resistors Rr3 and Rr6 have a resistance of 10 kΩ, and assume that both constant currents Cc1 and Cc2 are 10 μA.

Switch S1 is closed when POR asserted, enabling the indirect testing of the POR signal by evaluating POR-related signals. When switch S1 is closed and switches S2 and S3 are open, the resistance seen at the UVLO pin is 70 kΩ and therefore the voltage VUVLO is 700 mV. When switch S1 is closed and switch S2 is closed, while switch S3 remains open, the resistance seen at the UVLO pin is 30 kΩ and therefore VULVO is 300 mV. When switch S1 is closed and switch S3 is closed, while switch S2 remains open, the resistance seen at the UVLO pin is 50 kΩ and therefore VULVO is 500 mV. When switch S1 is closed and switches S2 and S3 are both closed, the resistance seen at the UVLO pin is 10 kΩ and therefore VULVO is 100 mV.

Switch S4 is closed when POR asserted, enabling the indirect testing of the POR signal by evaluating other POR-related signals. When switch S4 is closed and switches S5 and S6 are open, the resistance seen at the OVLO pin is 70 kΩ and therefore the voltage VOVLO is 700 mV. When switch S4 is closed and switch S5 is closed, while switch S6 remains open, the resistance seen at the OVLO pin is 30 kΩ and therefore VOLVO is 300 mV. When switch S4 is closed and switch S6 is closed, while switch S5 remains open, the resistance seen at the OVLO pin is 50 kΩ and therefore VOLVO is 500 mV. When switch S4 is closed and switches S5 and S6 are both closed, the resistance seen at the OVLO pin is 10 kΩ and therefore VOLVO is 100 mV.

In this example, when POR is asserted:

the first signal REG5V_OK being indicative of the 5V voltage regulator not functioning properly and the second signal REG1V8_OK being indicative of the 1.8V voltage not regulator functioning properly would result in switches S2 and S3 being open;

the first signal REG5V_OK being indicative of the 5V voltage regulator functioning properly but the second signal REG1V8_ok being indicative of the 1.8V voltage regulator not functioning properly would result in switch S2 being closed while switch S3 remains open;

the second signal REG1V8_ok being indicative of the 1.8V voltage regulator functioning properly but the first signal REG5V_OK being indicative of the 5V voltage regulator not functioning properly would result in switch S3 being closed while switch S2 remains open;

the first signal REG5V_OK being indicative of the 5V voltage regulator functioning properly and the second signal REG1V8_ok being indicative of the 1.8V voltage regulator functioning properly would result in switches S2 and S3 being closed;

the signal OSC_OK being indicative of the clock frequency not having stabilized and the signal BG_OK being indicative of the bandgap voltage regulator not functioning properly would result in switches S5 and S6 being open;

the signal OSC_OK being indicative of the clock frequency having stabilized and the signal BG_OK being indicative of the bandgap voltage regulator not functioning properly would result in switch S5 being closed while switch S6 remains open;

the signal OSC_OK being indicative of the clock frequency not having stabilized and the signal BG_OK being indicative of the bandgap voltage regulator functioning properly would result in switch S6 being closed while switch S5 remains open; and the signal OSC_OK being indicative of the clock frequency having stabilized and the signal BG_OK being indicative of the bandgap voltage regulator functioning properly would result in switches S5 and S6 being closed.

The following truth table summarizes the operation of switches S2 and S3, and the resulting resistance seen at UVLO dependent upon the logic values of REG1V8_OK and REG5V_OK.

| REG1V8_OK | REG5V_OK | S2 | S3 | Resistance at UVLO |
|---|---|---|---|---|
| 0 | 0 | 0 | 0 | 70 kΩ |
| 0 | 1 | 1 | 0 | 30 kΩ |
| 1 | 0 | 0 | 1 | 50 kΩ |
| 1 | 1 | 1 | 1 | 10 kΩ |

The following truth table summarizes the operation of switches S5 and S6, and the resulting resistance seen at OVLO dependent upon the logic values of BG_OK and OSC_OK.

| BG_OK | OSC_OK | S5 | S6 | Resistance at UVLO |
|---|---|---|---|---|
| 0 | 0 | 0 | 0 | 70 kΩ |
| 0 | 1 | 1 | 0 | 30 kΩ |
| 1 | 0 | 0 | 1 | 50 kΩ |
| 1 | 1 | 1 | 1 | 10 kΩ |

After the POR is complete in this example, switches S1 and S4 open while switches Sw1 and Sw2 close, providing for normal operation of the UVLO and OVLO pins.

In conclusion, since the POR signal itself is not directly accessed or measured, the disclosed POR signal testing circuit 50 provides an indirect way to test the proper generation and status of the POR signal. By using the UVLO and OVLO pins, the status of the POR signal may be read externally, which simplifies the testing process.

Indeed, the disclosed POR signal testing circuit offers several advantages. First, the indirect testing of the POR signal reduces the risk of interfering with the normal operation of the POR signal generator itself. Second, the use of the UVLO and OVLO pins for external reading makes it easier to interface with external test equipment, while not using additional pins (since the UVLO and OVLO circuits are functional when their inputs are left floating). Lastly, the use of resistor dividers and constant currents enables a precise and reliable indication of the status of the relevant signals.

It is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A testing circuit for indirectly testing generation of a power-on-reset (POR) signal within an integrated circuit (IC), the testing circuit comprising:
a switch configured to selectively disconnect an internal circuit from a test pin of the IC in response to start-up of the IC;
a plurality of resistors connected between the test pin and a respective plurality of switches that are configured to selectively connect ones of the plurality of resistors to ground in response to corresponding control signals; and
a control circuit configured to produce, at the test pin, a resistance indicative of status of generation of the POR signal by selectively operating the plurality of switches based upon statuses of a plurality of signals from which the POR signal is generated.

2. The testing circuit of claim 1, wherein the control circuit comprises one or more decoders.

3. The testing circuit of claim 2, wherein the statuses of the plurality of signals based upon which the POR signal is generated is determined based upon signals indicative of those statuses.

4. The testing circuit of claim 3, wherein the signals indicative of the statuses of the plurality of signals include at least one regulator status signal, at least one reference voltage generator status signal, and at least one clock status signal.

5. The testing circuit of claim 4, wherein the at least one regulator status signal is indicative of a regulated voltage generated by an associated voltage regulator being within desired thresholds, wherein the at least one reference voltage generator status signal is indicative of stabilization of a reference voltage generated by an associated reference voltage generator, and wherein the at least one clock status signal is indicative of stabilization of an associated clock signal.

6. The testing circuit of claim 1, wherein the test pin is an Under-Voltage Lock-Out pin; and wherein the internal circuit is Under-Voltage Lock-Out circuitry configured to determine whether a supply voltage for the IC has fallen below a lower threshold.

7. The testing circuit of claim 1, wherein the test pin is an Over-Voltage Lock-Out pin; and wherein the internal circuit is Over-Voltage Lock-Out circuitry configured to determine whether a supply voltage for the IC has risen above an upper threshold.

8. The testing circuit of claim 1, further comprising:
an additional switch configured to selectively disconnect an additional internal circuit from an additional test pin of the IC in response to start-up of the IC;
an additional plurality of resistors connected between the additional test pin and a respective additional plurality of switches that are configured to selectively connect ones of the additional plurality of resistors to ground in response to corresponding additional control signals; and
an additional control circuit configured to produce, at the additional test pin, a resistance indicative of status of generation of the POR signal by selectively operating the additional plurality of switches using the additional control signals based upon statuses of an additional plurality of signals based upon which the POR signal is generated.

9. The testing circuit of claim 8, wherein the statuses of the additional plurality of signals based upon which the POR signal is generated is determined based upon signals indicative of those statuses.

10. The testing circuit of claim 9, wherein the signals indicative of the statuses of the plurality of signals include at least one regulator status signal.

11. The testing circuit of claim 10, wherein the at least one regulator status signal is indicative of a regulated voltage generated by an associated voltage regulator being within desired thresholds.

12. The testing circuit of claim 9, wherein the signals indicative of the statuses of the plurality of signals include at least one reference voltage generator status signal and at least one clock status signal; wherein the at least one reference voltage generator status signal is indicative of stabilization of a reference voltage generated by an associated reference voltage generator, and wherein the at least one clock status signal is indicative of stabilization of an associated clock signal.

13. The testing circuit of claim 8, wherein the additional test pin is either:
- an Under-Voltage Lock-Out pin, and the additional internal circuit is Under-Voltage Lock-Out circuitry configured to determine whether a supply voltage for the IC has fallen below a lower threshold; or
- an Over-Voltage Lock-Out pin, and the additional internal circuit is Over-Voltage Lock-Out circuitry configured to determine whether a supply voltage for the IC has risen above an upper threshold.

14. A method for indirectly testing generation of a power-on-reset (POR) signal within an integrated circuit (IC), the method comprising:
- disconnecting one or more test pins from corresponding internal circuit(s);
- determining a status of a plurality of signals based upon which the POR signal is generated;
- changing a resistance at the one or more test pins based upon the determined statuses of the plurality of signals;
- measuring the resistance at the one or more test pins; and
- determining a status of generation of the POR signal based upon the measured resistance(s).

15. The method of claim 14, wherein measuring the resistance at the one or more test pins comprises applying a constant current to the one or more test pins and measuring resulting voltages at those one or more test pins; and wherein determining the status of generation of the POR signal is performed based upon the resulting voltage(s).

16. The method of claim 14,
- wherein the status of the plurality of signals based upon which the POR signal is generated is determined by:
  - monitoring a plurality of status signals indicative of the status of the plurality of signals based upon which the POR signal is generated: and
- wherein the resistance at the one or more test pins is changed based upon the determined statuses of the plurality of signals by:
  - operating a series of switches to selectively connect one or more resistors between the one or more test pins and ground based upon the plurality of status signals.

17. The method of claim 16, wherein the plurality of status signals include one or more of:
- at least one reference voltage generator status signal indicative of stabilization of a reference voltage generated by an associated reference voltage generator;
- at least one clock status signal indicative of stabilization of an associated clock signal; and
- at least one regulator status signal indicative of a regulated voltage generated by an associated voltage regulator being within desired thresholds.

18. The method of claim 14, wherein the one or more test pins comprise an Under-Voltage Lock-Out pin and the internal circuit is Under-Voltage Lock-Out circuitry configured to determine whether a supply voltage for the IC has fallen below a lower threshold.

19. The method of claim 14, wherein the one or more test pins comprise an Over-Voltage Lock-Out pin and the internal circuit is Over-Voltage Lock-Out circuitry configured to determine whether a supply voltage for the IC has risen above an upper threshold.

20. The method of claim 14,
- wherein the status of the plurality of signals based upon which the POR signal is generated is determined by:
  - monitoring a plurality of status signals indicative of the status of the plurality of signals based upon which the POR signal is generated; and
- wherein the resistance at the one or more test pins is changed based upon the determined statuses of the plurality of signals by:
  - operating a series of switches to selectively connect one or more resistors in series between the one or more test pins and ground based upon the plurality of status signals.

\* \* \* \* \*